United States Patent
Winger et al.

(10) Patent No.: US 11,762,406 B2
(45) Date of Patent: Sep. 19, 2023

(54) VOLTAGE CONTROL AND NOISE ISOLATION FOR A FUSE SYSTEM

(71) Applicant: GM GLOBAL TECHNOLOGY OPERATIONS LLC, Detroit, MI (US)

(72) Inventors: Lyall Kenneth Winger, Waterloo (CA); James Morrison, Sebringville (CA); Suresh Gopalakrishnan, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/470,757

(22) Filed: Sep. 9, 2021

(65) Prior Publication Data
US 2023/0070183 A1    Mar. 9, 2023

(51) Int. Cl.
*G05F 1/56*    (2006.01)
*B60R 16/02*    (2006.01)

(52) U.S. Cl.
CPC ............... *G05F 1/56* (2013.01); *B60R 16/02* (2013.01)

(58) Field of Classification Search
None
See application file for complete search history.

(56) References Cited

U.S. PATENT DOCUMENTS

| | | | | |
|---|---|---|---|---|
| 6,441,594 B1* | 8/2002 | Connell | .................. | G05F 1/575 323/276 |
| 9,225,158 B2* | 12/2015 | Kawamoto | .............. | H02H 3/08 |
| 9,304,152 B2* | 4/2016 | Aerts | ...................... | G05F 1/573 |
| 9,461,541 B2* | 10/2016 | Schweigert | ........... | H02M 3/158 |
| 9,679,885 B2* | 6/2017 | Lidsky | ...................... | H02H 3/42 |
| 9,780,660 B2* | 10/2017 | Hashimoto | ........... | H01L 29/786 |
| 10,008,846 B2* | 6/2018 | van Dijk | .................. | H02H 3/08 |
| 10,038,434 B2* | 7/2018 | Volke | .................... | H03K 17/166 |
| 10,320,180 B1* | 6/2019 | Venigalla | ............... | H02H 3/087 |
| 10,431,973 B2* | 10/2019 | Morimoto | .............. | H02H 3/087 |
| 10,742,017 B2* | 8/2020 | Morimoto | .............. | H02H 3/087 |
| 11,139,808 B2* | 10/2021 | Yoshida | ............. | H03K 17/0828 |
| 2014/0167797 A1* | 6/2014 | Aerts | ...................... | G05F 1/573 324/750.3 |

* cited by examiner

*Primary Examiner* — Thomas J. Hiltunen
(74) *Attorney, Agent, or Firm* — CANTOR COLBURN LLP

(57) ABSTRACT

A system for regulating voltage includes an electronic fuse including a switching component and an active control circuit connected to the switching component, the control circuit configured to open the switching component based on at least an overcurrent condition. The system also includes a voltage regulation component connected to the switching component, the voltage regulation component configured to regulate a voltage across the switching component by applying a voltage to the switching component based on a measured voltage drop across the switching component, and a desired load voltage.

18 Claims, 6 Drawing Sheets

VOLTAGE CONTROL AND NOISE ISOLATION FOR A FUSE SYSTEM

INTRODUCTION

The subject disclosure relates to electrical protection systems, and more particularly to control of fuses.

Electrical protection devices and systems, such as fuses and circuit breakers, are commonly employed to protect from short circuits, potential damage to electronic components and/or sub-optimal operation. For example, vehicles (e.g., gas, hybrid and electric vehicles) feature one or more fuse assemblies, such as fuse boxes or fuse panels, that connect to various loads. Typically, multiple loads are connected to a power source through a fuse assembly. Some loads may be non-linear and can introduce noise into the fuse assembly, which can negatively affect other loads, including noise sensitive loads such as sensors. Accordingly, it is desirable to provide a device or system that can reduce or eliminate noise in an electrical protection system.

SUMMARY

In one exemplary embodiment, a system for regulating voltage includes an electronic fuse including a switching component and an active control circuit connected to the switching component, the control circuit configured to open the switching component based on at least an overcurrent condition. The system also includes a voltage regulation component connected to the switching component, the voltage regulation component configured to regulate a voltage across the switching component by applying a voltage to the switching component based on a measured voltage drop across the switching component, and a desired load voltage.

In addition to one or more of the features described herein, the switching component is a field effect transistor.

In addition to one or more of the features described herein, the voltage regulation component is configured to apply the voltage to the switching component to cause the switching component to output a regulated voltage, the regulated output voltage being a constant voltage or being a within a selected voltage range.

In addition to one or more of the features described herein, the voltage regulation component is configured to apply the voltage to the switching component in response to non-linearities in a measured input voltage, the applied voltage configured to maintain an output voltage of the switching component at a stable level.

In addition to one or more of the features described herein, the voltage regulation component is configured to apply the voltage to the switching component to generate an output voltage in a linear region of the switching component, and maintain the output voltage to a value within a selected range of the desired load voltage.

In addition to one or more of the features described herein, the electronic fuse is connected in series to a load, and the voltage regulation component includes a voltage regulation circuit connected in parallel to the switching component and the control circuit.

In addition to one or more of the features described herein, the voltage regulation circuit includes a comparator configured to receive a signal indicative of the voltage drop across the switching component, and a gate drive circuit configured to set the switching component to a desired output voltage in conjunction with the comparator.

In addition to one or more of the features described herein, the electronic fuse is connected in series to the load and a generator, and the voltage regulation circuit includes a filter configured to receive a measurement of an input voltage supplied by the generator, and filter the input voltage to reduce non-linearities in the input voltage, the filtered input voltage used to determine the voltage drop.

In addition to one or more of the features described herein, the electronic fuse and the voltage regulation component are included in a fuse assembly of a vehicle.

In one exemplary embodiment, a method of regulating voltage includes receiving an input voltage at an electronic fuse, the electronic fuse including a switching component and an active control circuit connected to the switching component, the control circuit configured to open the switching component based on at least an overcurrent condition. The method also includes measuring the input voltage and an output voltage of the switching component, determining a voltage drop across the switching component, and regulating a voltage across the switching component by a voltage regulation component connected to the switching component, the regulating including applying a voltage to the switching component based on the voltage drop and a desired load voltage.

In addition to one or more of the features described herein, the applied voltage is configured to cause the switching component to output a regulated voltage, the regulated output voltage being a constant voltage or a within a selected voltage range.

In addition to one or more of the features described herein, applying the voltage to the switching component is in response to non-linearities in the measured input voltage, the applied voltage configured to maintain the output voltage of the switching component at a stable level.

In addition to one or more of the features described herein, the applied voltage is configured to generate a regulated output voltage in a linear region of the switching component, and maintain the regulated output voltage to a value within a selected range of the desired load voltage.

In addition to one or more of the features described herein, the electronic fuse is connected in series to a load, and the voltage regulation component includes a voltage regulation circuit connected in parallel to the switching component and the control circuit.

In addition to one or more of the features described herein, the voltage regulation circuit includes a comparator configured to receive a signal indicative of the voltage drop, and a gate drive circuit configured to set the switching component to a desired output voltage in conjunction with the comparator.

In addition to one or more of the features described herein, the electronic fuse is connected in series to the load and a generator, and the voltage regulation circuit includes a filter configured to receive a measurement of the input voltage supplied by the generator, and filter the input voltage to reduce non-linearities in the input voltage, the filtered input voltage used to determine the voltage drop.

In one exemplary embodiment, a vehicle system includes a memory having computer readable instructions, and a processing device for executing the computer readable instructions, the computer readable instructions controlling the processing device to perform a method. The method includes receiving an input voltage at an electronic fuse, the electronic fuse including a switching component and an active control circuit connected to the switching component, the control circuit configured to open the switching component based on at least one of an overcurrent condition and an overvoltage condition. The method also includes measuring the input voltage and an output voltage of the switching component, determining a voltage drop across the switching component, and regulating a voltage across the switching component by a voltage regulation component connected to the switching component, the regulating including applying a voltage to the switching component based on the voltage drop and a desired load voltage.

In addition to one or more of the features described herein, the applied voltage is configured to cause the switching component to output a regulated voltage, the regulated voltage being a constant voltage or a within a selected voltage range.

In addition to one or more of the features described herein, applying the voltage to the switching component is in response to non-linearities in a measured input voltage, the applied voltage configured to maintain the output voltage of the switching component at a stable level.

In addition to one or more of the features described herein, the applied voltage is configured to generate a regulated output voltage in a linear region of the switching component, and maintain the regulated output voltage to a value within a selected range of the desired load voltage.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
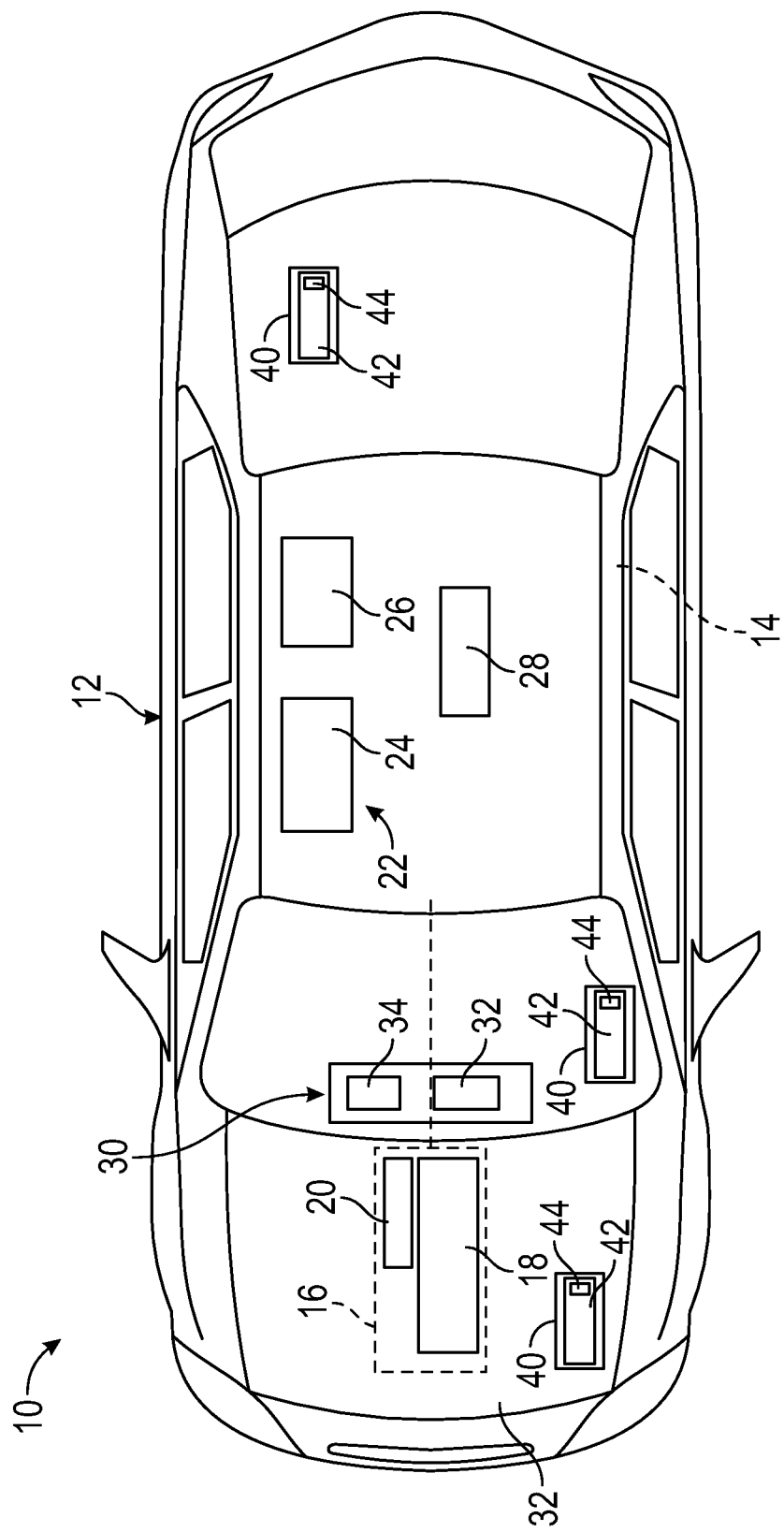
FIG. 1 is a top view of a motor vehicle including various vehicle subsystems and one or more electrical protection systems, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods, devices and systems are provided for regulation and/or control of one or more fuses. An embodiment of a voltage regulation component is operably connected to a fuse and is configured to regulate a voltage of a switching component of the fuse. The voltage regulation component can regulate a voltage drop across the switching component and thereby regulate an output voltage of the switching component. Such regulation may include limiting the switching component voltage, reducing or eliminating noise, providing a desired voltage distribution among multiple fuses, and/or maintaining a constant voltage drop.

The one or more fuses may each be an electronic fuse (e.g., an e-fuse or smart fuse) that includes a switching component such as a field effect transistor (FET), and a control circuit. The control circuit is configured to open the switching component based on detecting an overcurrent condition, an overvoltage condition and/or other condition (e.g., temperature exceeding thermal limit). In an embodiment, the voltage regulation component includes a voltage regulation circuit that is connected to a fuse in addition to the control circuit. The voltage regulation circuit may be incorporated within the circuitry or package of a fuse, or may be a separate component electrically connected thereto. For example, the voltage regulation circuit is connected in parallel to a fuse and an associated control circuit.

An embodiment of a voltage regulation component is configured to regulate an output voltage from the fuse based on a measurement or measurements related to a voltage drop across the fuse. In an embodiment, the voltage regulation component includes a closed loop voltage regulation circuit connected in parallel to the switching component, which is configured to measure (or receive a measurement of) voltage into the switching component ($V_{IN}$) and voltage out of the switching component ($V_{OUT}$), and regulate the fuse output voltage based on the measurements. In an embodiment, the voltage regulation circuit includes a comparator circuit and a gate drive to regulate the fuse voltage and/or filter non-linear components.

Embodiments also include an electrical protection system that includes a plurality of individual fuses. An example of a protection system includes a fuse block or fuse panel that supports an array of fuses, each connected to a respective vehicle subsystem. The voltage regulation component in each fuse acts to regulate voltage to maintain a consistent output and reduce or eliminate the effects of noise due to loads connected to other fuses.

Embodiments described herein present numerous advantages and technical effects. The embodiments reduce noise and other non-linearities in a fuse assembly. Regulating voltage as described herein can reduce the amount of noise introduced into the fuse assembly (e.g., from noisy or non-linear loads), and thereby reduce the amount of noise that reaches noise sensitive components such as sensors (e.g., cameras, radar, lidar, etc.). This reduction can increase the performance of sensors and other components and may reduce the cost, for example, by reducing the need for regulation components and filters to be incorporated into sensors.

The embodiments describe herein are not limited to use with any specific vehicle, device or system, and may be applicable to various devices and systems that utilize fuses. For example, embodiments may be used with automobiles, trucks, aircraft, construction equipment, farm equipment, automated factory equipment and/or any other device or system that includes fuses.

FIG. 1 shows an embodiment of a motor vehicle 10, which includes a vehicle body 12 defining, at least in part, an occupant compartment 14. The vehicle body 12 also supports various vehicle subsystems including a propulsion assembly 16, and other subsystems to support functions of the propulsion assembly 16 and other vehicle components, such as a braking subsystem, a suspension system, a steering subsystem, a fuel injection subsystem, an exhaust subsystem and others.

The vehicle may be a combustion engine vehicle, an electrically powered vehicle (EV) or a hybrid vehicle. In an example, the vehicle 10 is a hybrid vehicle that includes a combustion engine assembly 18 and an electric motor assembly 20.

Various vehicle subsystems may be powered by one or more batteries, such as a battery assembly 22, which may be electrically connected to the motor assembly 20 and/or other components, such as vehicle electronics, lighting subsystems, an ignition subsystem, climate control subsystems, sensors and others. In an embodiment, the battery assembly 22 is configured as a rechargeable energy storage system (RESS), and includes a high voltage battery pack 24 and a control unit 26.

The vehicle 10 includes various processing devices and/or units for controlling aspects of the vehicle. For example, an electronic control unit (ECU) 28 is included to control operation of vehicle subsystems. The vehicle 10 also includes a computer system 30 that includes one or more processing devices 32 and a user interface 34. The various processing devices and units may communicate with one another via a communication device or system, such as a controller area network (CAN) or transmission control protocol (TCP) bus.

The vehicle 10 also includes one or more electrical protection devices or systems configured to protect electronic components and circuitry from excess current (overcurrent) and voltage (overvoltage). In an embodiment, the vehicle 10 includes one or more protection systems that each include a fuse panel supporting one or more fuses and a controller. For example, the vehicle 10 includes one or more fuse blocks 40, each of which includes a fuse panel 42 and a controller 44. The fuse blocks 40 may be positioned at various locations. For example, the vehicle 10 includes a fuse block 40 in the engine bay, at or near an instrument panel and in a rear compartment.

Figure 2:
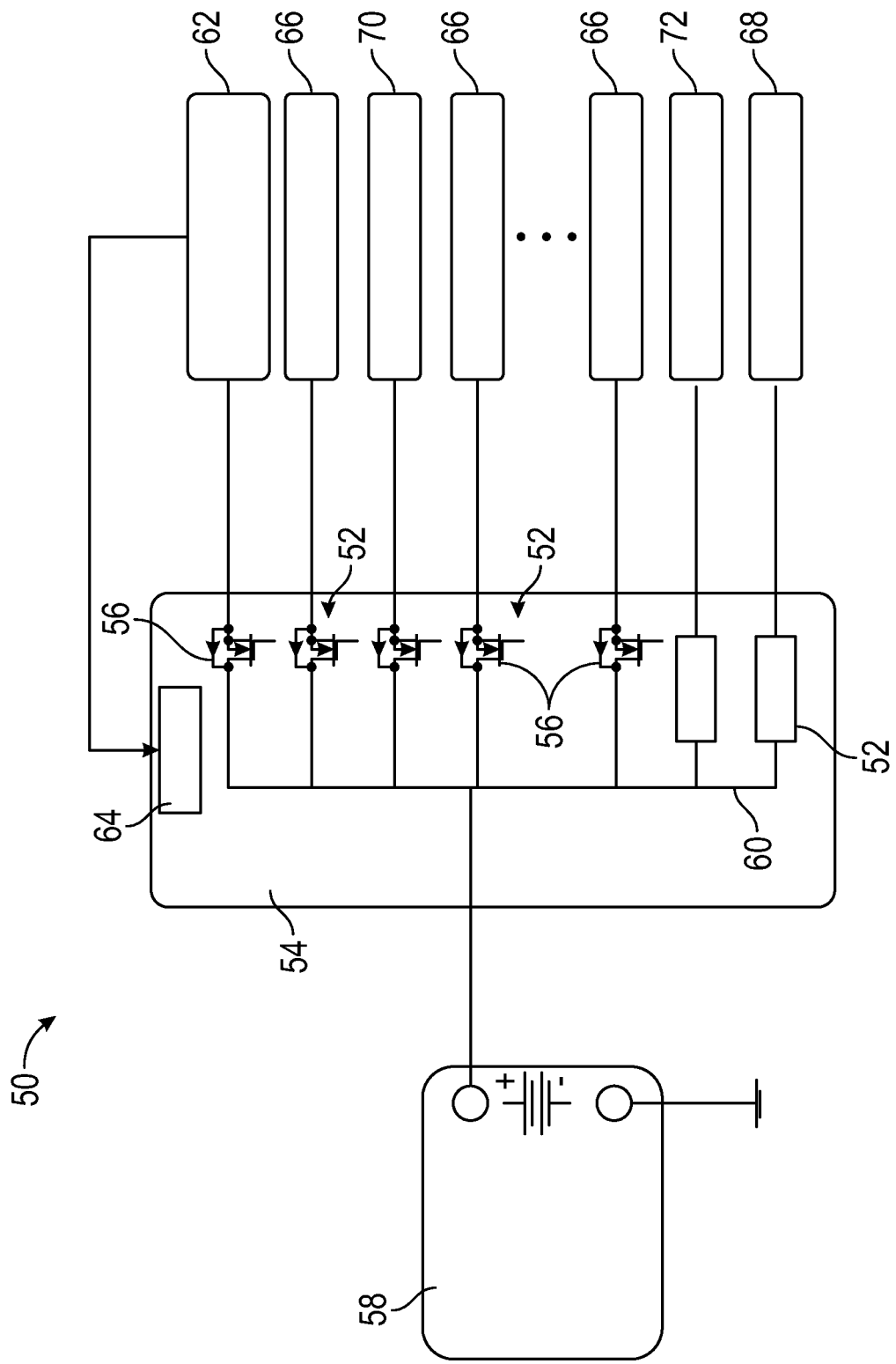
FIG. 2 depicts an electrical protection system including multiple electronic fuses and at least one voltage regulation component, in accordance with an exemplary embodiment.

FIG. 2 depicts an embodiment of a protection system 50 including one or more fuse circuits 52, also referred to as electronic fuses 52. One or more of the fuse circuits 52 incorporate or are connected to a voltage regulation component (e.g., a voltage regulation circuit connected to the circuitry of a fuse 52) configured to regulate an output voltage from the fuse 52 based on a measured voltage drop across a switching component of the fuse 52.

The protection system 50 may be incorporated into any vehicle, device, machine or system for which electrical protection is desired. For example, the protection system 50 may be incorporated into the vehicle 10 as part of a fuse block 40.

In this embodiment, the fuses 52 are arrayed on a fuse panel 54, and each fuse 52 includes an active controllable fuse circuit that includes a transistor 56 as the switching component. The transistor 56 may be a field effect transistor (FET) (e.g., a metal-oxide-semiconductor or MOSFET), which acts as a pass element in the fuse 52. When voltage and current pass through the transistor 56, the transistor 56 is controlled to limit or otherwise regulate the output current and voltage.

Each fuse 52 has a control circuit that includes components for controlling the transistor 56 to open when there is an overcurrent or overvoltage condition, or a thermal event (e.g., temperature at or approaching a thermal limit). Such components include, for example, overvoltage protection, overcurrent protection, short-circuit protection, FET gate control, load inrush current control, reverse current protection (e.g., a blocking FET for blocking reverse currents), programmable self-resetting components for after-fault recovery, surge protection and others.

The protection system 50 is connected to a battery 58 for supplying power to various vehicle subsystems (or any other suitable device or system). The fuses 52 are connected to the battery 58 via a conductor 60 (e.g., traces or leads), and each fuse 52 is in turn connected to a respective load or generator (e.g., an alternator). The battery 58 may be connected directly to the fuse panel 54, or via a cable if the battery 58 and the fuse panel 54 are separately located in a vehicle. For example, if there are multiple fuse panels 54, the battery 58 is connected via a respective cable to each fuse panel 54. Each cable may be equipped with its own pre-fuse, which may be a standard fuse or electronic fuse.

For example, one fuse 52 is connected to a control system or module, such as a body control module (BCM) 62 that controls various vehicle electronics, including a fuse panel controller 64. Other fuses 52 are connected to respective system components. For example, a fuse 52 is connected to each of various system loads 66 (e.g., motor subsystem, vehicle lights, electronics, etc.), a fuse 52 is connected to a starter 68, and a fuse 52 is connected to each of various noise sensitive or "quiet" loads 70. In addition, a fuse 52 may be connected to a generator 72. It is noted that one or more of the loads, starter and generator may be connected to a standard thermal fuse, either in place of the electronic fuse 52 or in addition thereto.

The voltage regulation component of each fuse 52 regulates a voltage drop across the transistor 56, which is affected by the battery 58 and a load or generator. Such regulation can reduce or eliminate effects of noise from other loads (e.g., loads 66) on a noise sensitive load 70 (e.g., a sensor), by reducing noise from non-linearities in voltage provided by the other loads, and preventing the noise from reaching the noise sensitive load 70. This allows for increased performance and/or reduced cost and complexity by eliminating the need for certain noise reduction components in the sensors. In addition, the voltage regulation component can reduce noise going back into the fuse panel 54 from noisy loads.

For example, by regulating a given fuse 52 and/or transistor 56, noise from a load or source (e.g., a load 66) can be prevented from entering onto the trace or conductor 60 by filtering noise from the load or source as discussed herein. In addition, the given fuse 52 regulates voltage out to a quiet load 70 by filtering noise going out to the quiet load 70. If a load 66 is connected to a standard fuse (instead of a fuse 52) and a fuse 52 is connected to a quiet load 70, the fuse 52 can still regulate voltage and filter noise to prevent such noise from being output to the quiet load 70.

The voltage regulation component may be operated in conjunction with one or more methods of controlling a fuse or fuses (e.g., fuse(s) 52). An embodiment of a method includes measuring, by the voltage regulation component (e.g., voltage regulation circuit), a voltage drop across a pass element of a fuse, such as a FET or other switching component. The measured voltage drop is input to a circuit component or components, such as a comparator circuit and a gate driver, which apply a voltage to the pass element based on the measured voltage drop and a desired output voltage of the switching component (e.g., the FET 56). The voltage is applied to the pass element to control the resistance thereof to clamp the pass element to a selected voltage range, linearize the voltage across the fuse and/or maintain the fuse at a selected constant voltage. In an embodiment, the methods include dynamically limiting or regulating the output voltage as input voltages change.

In the embodiment of FIG. 2, each load and generator is connected to a fuse 52 having one electronic fuse circuit. However, embodiments described herein are not so limited, as multiple fuse circuits (each having a pass element and control circuit) may be incorporated in a fuse 52. For example, a fuse 52 cam include multiple fuse circuits having a single output, forming a "virtual e-Fuse" that is controlled, configured and/or monitored by a controller (e.g., a microprocessor control unit, the BCM 62 and/or the fuse panel controller 64) to behave as one larger, virtual e-Fuse. In this way, loads of varying degrees of power can be dynamically controlled by adding physical fuse channels in parallel.

FIGS. 3-7 depict embodiments of the fuse 52 and corresponding methods of voltage control. In these embodiments, a voltage regulation component is included with the fuse circuitry, but is not so limited. The voltage regulation component may be in the form of a closed loop voltage regulation circuit 75 that is connected in parallel at opposing sides of an FET 72 or other switching component. The FET 72 acts as a series switch and pass element.

Figure 3:
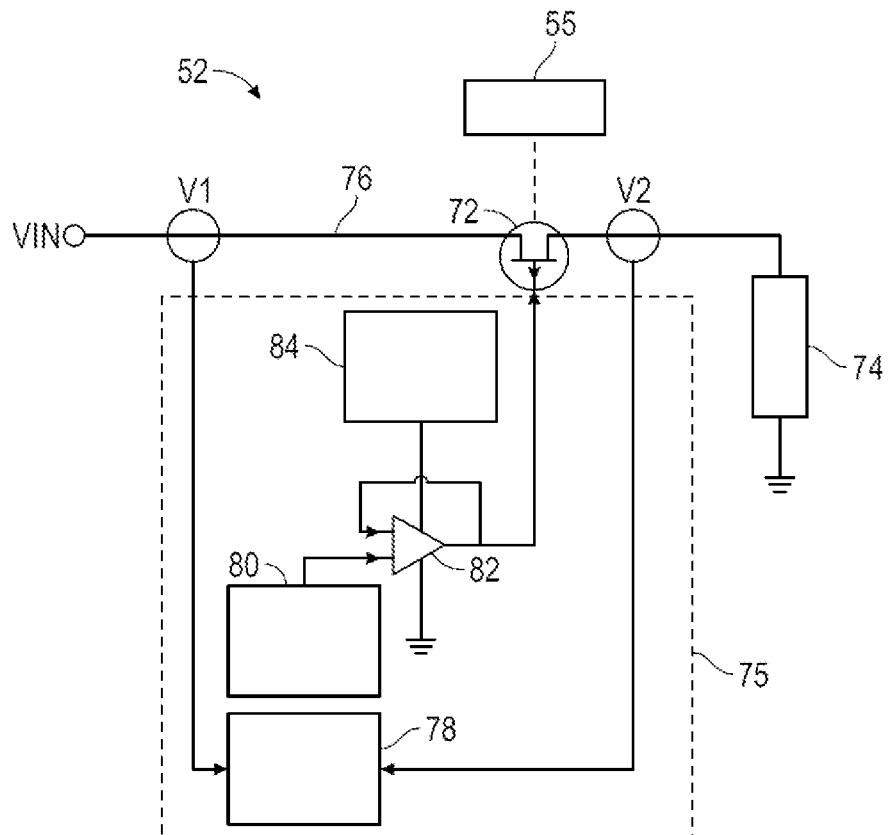
FIG. 3 depicts part of a circuitry of an electronic fuse including a voltage regulation circuit, in accordance with an exemplary embodiment.

FIG. 3 depicts an embodiment of the fuse 52 and the voltage regulation circuit 75. The voltage regulation circuit 75 is configured to regulate voltage across a pass element of the fuse 52, which in this embodiment is a FET 72. The FET 72 is connected in series with a power supply (e.g., a battery) and a load 74, and acts as a series switch. An input voltage ($V_{IN}$) is provided by the power supply, and the fuse 52 outputs a voltage ($V_{OUT}$) to the load 74.

The voltage regulation circuit 75 is configured to measure a voltage V1 at a conductor (trace) 76 on the input side of the FET 72 (i.e., the side at which current is input to the fuse), and measure a voltage V2 on the output side of the FET 72 (i.e., the side from which current is output from the fuse 52). A difference between these measured voltages represents the voltage drop across the FET 72, and is used by the voltage regulation circuit 75 to actively control the resistance and current through the FET 72 to regulate the voltage drop and the output voltage. For example, the regulation circuit 75 maintains the voltage drop at a constant level and/or within a range of voltage values in the linear region of the FET 72. Voltage regulation in this embodiment is useful, for example, in scenarios where the load 74 needs stable voltage but can be affected by noise produced by other non-linear loads, or where it is desirable to filter out noise to prevent noise from reaching a noise sensitive load.

The voltage regulation circuit 75 is connected in parallel to the pass element (FET), and in parallel with the fuse's control circuit (not shown). The regulation circuit 75 may be part of the fuse 52 itself (i.e., on the fuse substrate or within the fuse package).

The voltage regulation circuit 75 in this embodiment includes an analog-to-digital (A/D) converter 78 that receives voltage signals representing measurements of voltages V1 and V2, and converts the signals to a digital signal indicative of a measured voltage drop. The measured voltage drop is input to a digital-to-analog (D/A) converter 80 that inputs a voltage signal to a comparator circuit. The comparator circuit includes, in an embodiment, an operational amplifier or comparator 82. The comparator 82 is configured as a closed loop comparator, which receives a feedback voltage signal from the comparator output and compares the feedback voltage to the measured voltage drop. The comparator 82 is driven by a gate drive charge pump circuit 84. The voltage applied to the FET 72 corresponds to a voltage level supplied by the gate drive charge pump 84, as scaled by the comparator based on the measured voltage drop.

Figure 4:
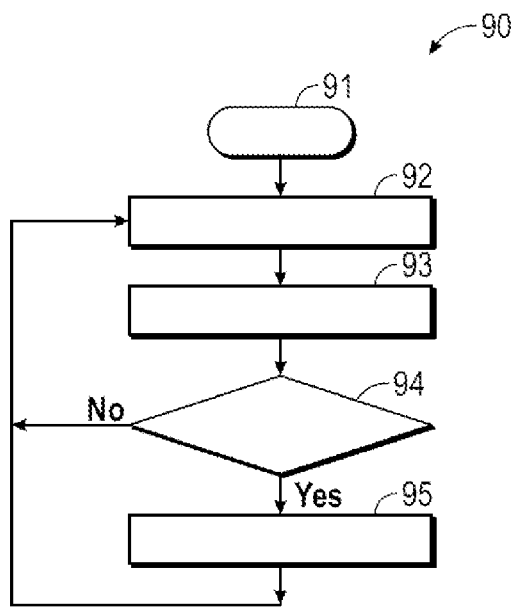
FIG. 4 is a flow diagram depicting aspects of a method of controlling or regulating an output voltage of a fuse.

FIG. 4 illustrates an embodiment of a method 90 of controlling an active fuse or fuses, including regulation of voltages output from a fuse to a load. Aspects of the method 90 may be performed by a processor or processors (e.g., the ECU 28, the BCM 62 or an on-board computer). It is noted the method 90 is not so limited and may be performed by any suitable processing device or system, or combination of processing devices.

The method 90 includes a number of steps or stages represented by blocks 91-95. The method 90 is not limited to the number or order of steps therein, as some steps represented by blocks 91-95 may be performed in a different order than that described below, or fewer than all of the steps may be performed.

At block 91, a desired output voltage (Vr) of the FET 72 is selected. For example, the desired output voltage Vr is selected based on the voltage requirements of a load, such as a load 66. If there are multiple loads, each fuse 52 is assigned a desired output voltage Vr based on the requirements of a respective load (e.g., a Heating Ventilation and Cooling (HVAC) subsystem, sensors, lighting, control units, etc.).

At block 92, a voltage drop across the FET 72 is measured by the voltage regulation circuit 75, e.g., via voltmeters. For example, voltage measurements V1 and V2 are transmitted to the A/D converter 78, and a difference between V1 and V2 is determined as a measured voltage drop (also referred to as a switch voltage Vf) representing a voltage across the FET 72 (drain-to-source or source-to-drain voltage).

At block 93, a difference between the desired output voltage Vr and the measured voltage V1 is calculated to determine a desired switch voltage Vf, i.e., the switch voltage that produces the desired output voltage Vr. The circuit 75, via the comparator 82 and the gate drive charge pump circuit 84, operate to apply a voltage to the FET gate and change the FET resistance so that the actual output voltage is within a desired range (e.g., with a range of the load voltage). The gate drive charge pump circuit 84 acts as a power supply that applies a selected voltage to the comparator 82, and the comparator 82 scales the applied voltage based on the difference between the measured switch voltage Vf and the feedback voltage.

At block 94, the voltage regulation circuit 75 (or other connected processor or circuit) measures and or receives a temperature measurement. The temperature measurement is compared to a thermal limit of the fuse (Tlimit). At block 95, if the temperature meets or exceeds Tlimit, the switch voltage Vf can be dynamically controlled to limit Vf accordingly, for example, by reducing the applied voltage from the gate drive charge pump circuit 84.

In some cases, the input voltage $V_{IN}$ varies non-linearly over time. This may occur when other loads connected to a fuse system are non-linear and introduce noise. If a load connected to the fuse 52 requires stable voltage, the voltage regulation circuit 75 can maintain the switch voltage Vf to within the linear region of the FET 72 and drive the FET 72 with a stable output voltage (e.g., an output voltage at a constant voltage level or within a desired voltage range). The voltage regulation circuit 75 can thus measure voltages or receive voltage measurements continuously or periodically, and dynamically control the switch voltage to clamp the output voltage to a stable voltage and/or a desired voltage value.

In the embodiments described herein, the voltage regulation circuit 70 may include a single FET 72 (e.g., MOSFET)

or multiple FETs 72. In a single FET embodiment, the FET 72 is configured to have a direction (orientation of the FETs body diode) so that current therethrough is interrupted when the FET is turned off. In a multiple FET embodiment, an arrangement of back-to-back FETs 72 having opposing directions are disposed in series with a load and/or generator.

Figure 5:
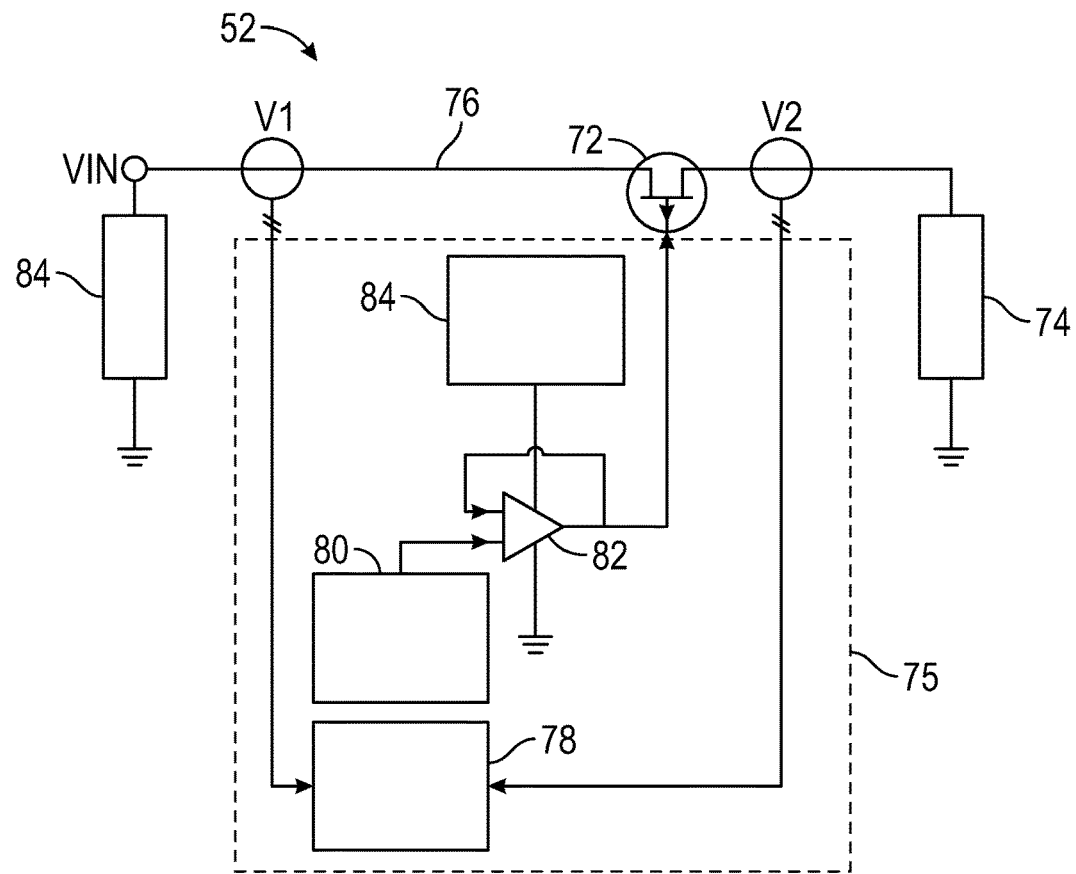
FIG. 5 depicts part of a circuitry of an electronic fuse, including a voltage regulation circuit configured to regulate an output voltage of the fuse to reduce non-linearities introduced by a generator, in accordance with an exemplary embodiment.
Figure 6:
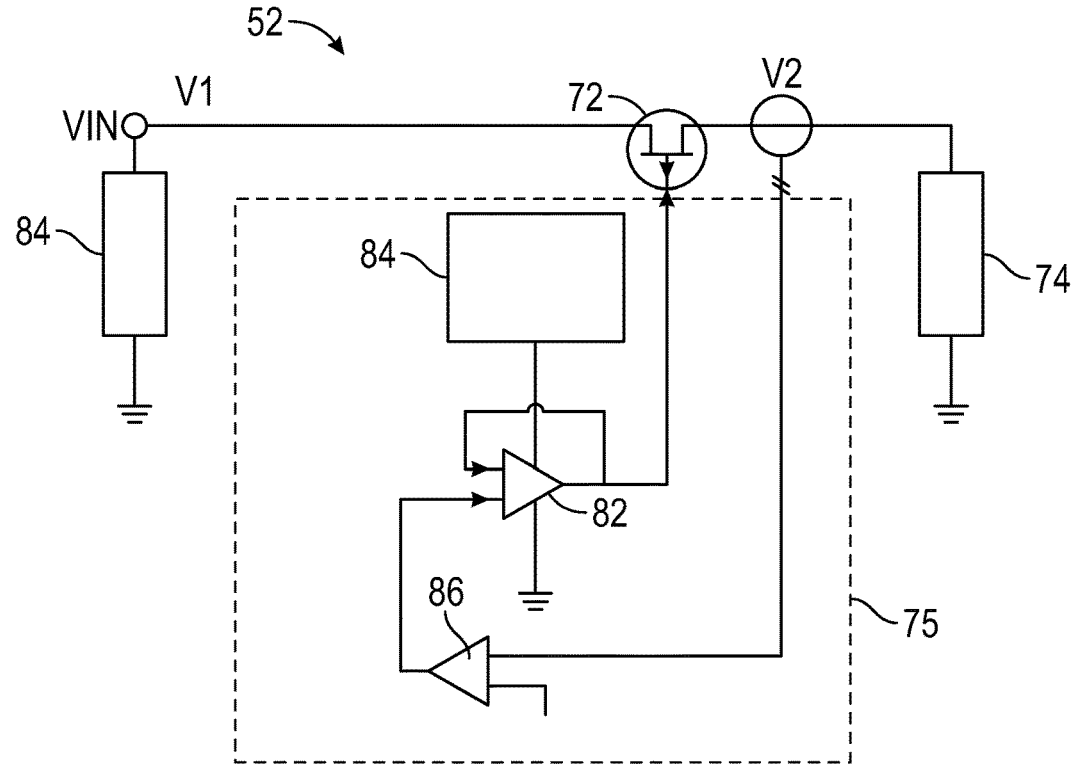
FIG. 6 depicts part of a circuitry of an electronic fuse including a voltage regulation circuit configured to regulate an output voltage of the fuse to reduce non-linearities introduced by a generator, in accordance with an exemplary embodiment.

FIGS. 5 and 6 depict embodiments of the voltage regulation circuit 75, which are configured to isolate noise from any non-linear source, such as a generator or back-propagation from a load (e.g., back-electromotive force (EMF) from a motor). In these embodiments, the voltage drop is regulated to compensate for noise from the generator. As a comparison, FIG. 3 shows the voltage regulation circuit 75 regulating the voltage output from the fuse 52, whereas FIGS. 5 and 6 show embodiments of the voltage regulation circuit regulating incoming voltage from a generator or other non-linear source.

FIG. 5 depicts the voltage regulation circuit 75 as connected to both a load and a source. In this embodiment, the FET 72 is connected in series to the load 74 and a generator 84, and acts to isolate noise from the generator 84. The generator 84 can introduce non-linearity in the input voltage $V_{IN}$, and thereby introduce noise in a system bus, due to ripples in the generator voltage and/or other transient conditions. The FET 72 is controlled via the comparator 82 and the charge pump 84 to operate in the linear region so that the FET 72 will be clamped to a desired voltage level. The FET 72 is also controlled to assure that the fuse 52 is operating within thermal limits. As noted above, the voltage protection circuit 75 can dynamically control the FET output voltage by adjusting the desired voltage level as conditions change (e.g., as the battery charge changes or the open circuit voltage reduces).

FIG. 6 depicts an embodiment of the voltage regulation circuit 75, which includes a filtering mechanism in addition to the comparator 82 and the charge pump 84. In this embodiment, the measured voltage V1 is filtered by, for example, a linear regulator to remove noise (ripples or other variations) from the voltage input by the generator 84. A linear regulator or other suitable filter (e.g., a low pass filter) may be used. As a result, a stable V1 voltage can be applied to the closed loop comparator circuit.

For example, the filtered V1 voltage is input to a comparator 86 along with the V2 voltage measurement. The comparator 86 outputs a signal representative of the difference between the filtered voltage V1 and the voltage V2 to the comparator 82, which then regulates the switch voltage as discussed above.

Figure 7:
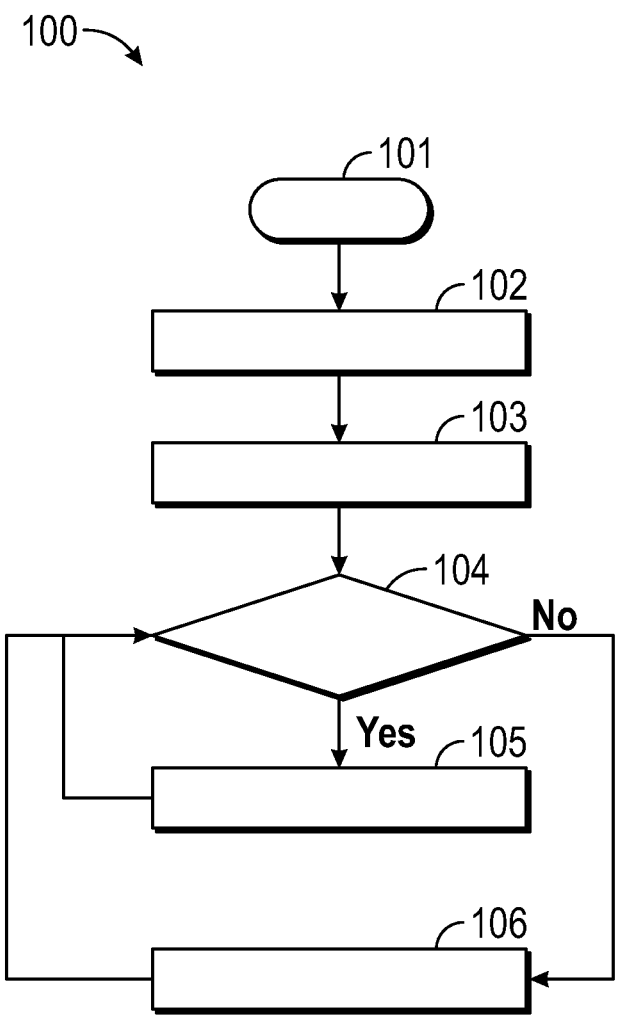
FIG. 7 is a flow diagram depicting aspects of a method of controlling or regulating an output voltage of a fuse.

FIG. 7 illustrates an embodiment of a method 100 of controlling an active fuse or fuses, and for noise isolation. Aspects of the method 100 may be performed by a processor or processors (e.g., the ECU 28, the BCM 62 or on-board computer). It is noted the method 100 is not so limited and may be performed by any suitable processing device or system, or combination of processing devices.

The method 100 includes a number of steps or stages represented by blocks 101-106. The method 100 is not limited to the number or order of steps therein, as some steps represented by blocks 101-106 may be performed in a different order than that described below, or fewer than all of the steps may be performed.

At block 101, a desired output voltage (Vr) of the FET 72 is selected. The desired output voltage Vr may be selected based on the voltage requirements of a load.

At block 102, a voltage drop across the FET 72 is measured by the voltage regulation circuit 75. Voltages V1 and V2 are measured and transmitted to the A/D converter 78. In addition, or alternatively, the voltage V1 may be filtered as discussed above.

At block 103, a difference between the voltage V1 and the voltage V2 is measured to determine the switch voltage Vf across the FET 72. At block 104, the measured switch voltage Vf is compared to the desired voltage Vr.

At block 105, if the switch voltage Vf is greater than Vr, the switch voltage is reduced. The switch voltage may be reduced by increasing the voltage input to the comparator 82, e.g., by increasing the voltage value provided by the D/A converter 80.

At block 106, if the switch voltage Vf is less than Vr, the switch voltage is increased. The switch voltage may be increased by reducing the voltage provided by the D/A converter 80.

After the voltage from the D/A converter 80 is adjusted, Vf is again calculated and compared to the desired voltage Vr, and the D/A converter voltage is adjusted accordingly. In this way, the voltage regulation circuit 75 can dynamically control the switch voltage to maintain the switch voltage at a desired level or within a desired range, and isolate noise from a source.

Figure 8:
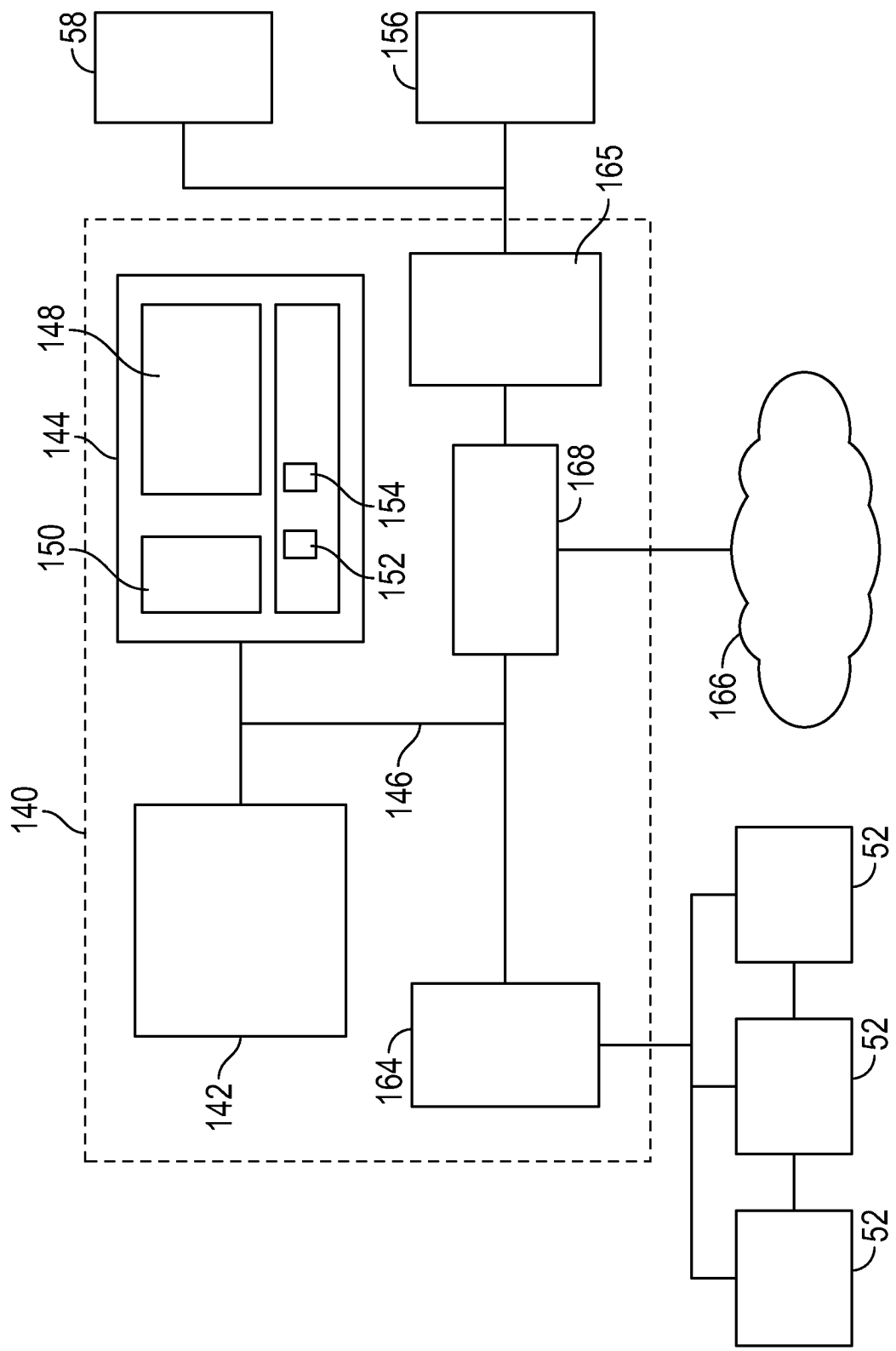
FIG. 8 depicts a computer system in accordance with an exemplary embodiment.

FIG. 8 illustrates aspects of an embodiment of a computer system 140 that can perform various aspects of embodiments described herein. The computer system 140 includes at least one processing device 142, which generally includes one or more processors for performing aspects of image acquisition and analysis methods described herein. The processing device 142 can be integrated into the vehicle 10, for example, as the on-board processing device 32, or a control module such as the BDM or controller.

Components of the computer system 140 include the processing device 142 (such as one or more processors or processing units), a memory 144, and a bus 146 that couples various system components including the system memory 144 to the processing device 142. The system memory 144 may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module or modules 152 may be included to perform functions related to controlling a fuse or fuses. An interface module 154 may be included for interacting with a user to facilitate various methods described herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices such as fuses 52. In addition, the processing device 142 may communicate with one or more devices or systems, such as the battery 58 and/or other components 156, such as vehicle subsystems, vehicle control modules, sensors and others. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for regulating voltage, comprising:
an electronic fuse including a switching component and an active control circuit connected to the switching component, the active control circuit configured to open the switching component based on at least an overcurrent condition; and
a voltage regulation component including a voltage regulation circuit connected in parallel to the switching component and the active control circuit, the voltage regulation component configured to regulate a voltage across the switching component by applying a voltage to the switching component based on a measured voltage drop across the switching component, and a desired load voltage, to maintain an output voltage of the switching component within a selected range of the desired load voltage, wherein the voltage regulation circuit includes a comparator configured to receive a signal indicative of the voltage drop across the switching component, and a gate drive circuit configured to set the switching component to a desired output voltage in conjunction with the comparator.

2. The system of claim 1, wherein the switching component is a field effect transistor.

3. The system of claim 1, wherein the voltage regulation component is configured to apply the voltage to the switching component to cause the switching component to output a regulated voltage, the regulated output voltage being a constant voltage or a being within a selected voltage range.

4. The system of claim 1, wherein the voltage regulation component is configured to apply the voltage to the switching component in response to non-linearities in a measured input voltage, the applied voltage configured to maintain an output voltage of the switching component at a stable level.

5. The system of claim 1, wherein the voltage regulation component is configured to apply the voltage to the switching component to generate an output voltage in a linear region of the switching component, and maintain the output voltage to a value within a selected range of the desired load voltage.

6. The system of claim 1, wherein the electronic fuse is connected in series to a load.

7. The system of claim 6, wherein the electronic fuse is connected in series to the load and a generator, and the voltage regulation circuit includes a filter configured to receive a measurement of an input voltage supplied by the generator, and filter the input voltage to reduce non-linearities in the input voltage, the filtered input voltage used to determine the voltage drop.

8. The system of claim 1, wherein the electronic fuse and the voltage regulation component are included in a fuse assembly of a vehicle.

9. A method of regulating voltage, comprising:
receiving an input voltage at an electronic fuse, the electronic fuse including a switching component and an active control circuit connected to the switching component, the active control circuit configured to open the switching component based on at least an overcurrent condition;
measuring the input voltage and an output voltage of the switching component, and determining a voltage drop across the switching component; and
regulating a voltage across the switching component by a voltage regulation component including a voltage regulation circuit connected in parallel to the switching component and the active control circuit, the regulating including applying a voltage to the switching component based on the voltage drop and a desired load voltage, to maintain an output voltage of the switching component within a selected range of the desired load voltage, wherein the voltage regulation circuit includes a comparator configured to receive a signal indicative of the voltage drop, and a gate drive circuit configured to set the switching component to a desired output voltage in conjunction with the comparator.

10. The method of claim 9, wherein the applied voltage is configured to cause the switching component to output a regulated voltage, the regulated output voltage being a constant voltage or a within a selected voltage range.

11. The method of claim 9, wherein applying the voltage to the switching component is in response to non-linearities in the measured input voltage, the applied voltage configured to maintain the output voltage of the switching component at a stable level.

12. The method of claim 9, wherein the applied voltage is configured to generate a regulated output voltage in a linear region of the switching component, and maintain the regulated output voltage to a value within a selected range of the desired load voltage.

13. The method of claim 9, wherein the electronic fuse is connected in series to a load.

14. The method of claim 13, wherein the electronic fuse is connected in series to the load and a generator, and the voltage regulation circuit includes a filter configured to receive a measurement of the input voltage supplied by the generator, and filter the input voltage to reduce non-linearities in the input voltage, the filtered input voltage used to determine the voltage drop.

15. A vehicle system comprising:
a memory having computer readable instructions; and
a processing device for executing the computer readable instructions, the computer readable instructions controlling the processing device to perform a method including:

receiving an input voltage at an electronic fuse, the electronic fuse including a switching component and an active control circuit connected to the switching component, the active control circuit configured to open the switching component based on at least one of an overcurrent condition and an overvoltage condition;

measuring the input voltage and an output voltage of the switching component, and determining a voltage drop across the switching component; and regulating a voltage across the switching component by a voltage regulation component including a voltage regulation circuit connected in parallel to the switching component and the active control circuit, the regulating including applying a voltage to the switching component based on the voltage drop and a desired load voltage, to maintain an output voltage of the switching component within a selected range of the desired load voltage, wherein the voltage regulation circuit includes a comparator configured to receive a signal indicative of the voltage drop, and a gate drive circuit configured to set the switching component to a desired output voltage in conjunction with the comparator.

16. The vehicle system of claim 15, wherein the applied voltage is configured to cause the switching component to output a regulated voltage, the regulated voltage being a constant voltage or a within a selected voltage range.

17. The vehicle system of claim 15, wherein applying the voltage to the switching component is in response to non-linearities in a measured input voltage, the applied voltage configured to maintain the output voltage of the switching component at a stable level.

18. The vehicle system of claim 15, wherein the applied voltage is configured to generate a regulated output voltage in a linear region of the switching component, and maintain the regulated output voltage to a value within a selected range of the desired load voltage.

* * * * *